US012741597B2

(12) United States Patent
Plowman et al.

(10) Patent No.: US 12,741,597 B2
(45) Date of Patent: Sep. 22, 2026

(54) METHOD AND SYSTEM FOR CALCULATING VEHICLE TRAILER ANGLE

(71) Applicant: Continental Autonomous Mobility Germany GmbH, Ingolstadt (DE)

(72) Inventors: Robin Plowman, Southwick (GB); Alexander Kadyrov, Eastbourne (GB)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 407 days.

(21) Appl. No.: 17/995,141

(22) PCT Filed: Dec. 1, 2020

(86) PCT No.: PCT/EP2020/084109
§ 371 (c)(1),
(2) Date: Sep. 30, 2022

(87) PCT Pub. No.: WO2021/197650
PCT Pub. Date: Oct. 7, 2021

(65) Prior Publication Data

US 2023/0173998 A1 Jun. 8, 2023

(30) Foreign Application Priority Data

Mar. 31, 2020 (EP) .................................... 20167188

(51) Int. Cl.

| | |
|---|---|
| ***B60R 11/04*** | (2006.01) |
| ***G06T 7/60*** | (2017.01) |
| ***G06T 7/73*** | (2017.01) |

(52) U.S. Cl.
CPC ................ *B60R 11/04* (2013.01); *G06T 7/60* (2013.01); *G06T 7/73* (2017.01); *G06T 2207/30252* (2013.01)

(58) Field of Classification Search
CPC .. B60R 11/04; G06T 7/60; G06T 7/73; G06T 2207/30252; G06T 2207/10016; B60D 1/245; B60D 1/62
See application file for complete search history.

(56) References Cited

U.S. PATENT DOCUMENTS

| | | | |
|---|---|---|---|
| 9,527,528 | B1 | 12/2016 | Harrison |
| 11,273,868 | B2 | 3/2022 | Gali |
| 2009/0022369 | A1 | 1/2009 | Satoh et al. |
| 2010/0083514 | A1 | 4/2010 | Williams |
| 2010/0171828 | A1 | 7/2010 | Ishii |

(Continued)

FOREIGN PATENT DOCUMENTS

| | | | |
|---|---|---|---|
| CN | 101116101 | A | 1/2008 |
| CN | 105270408 | A | 1/2016 |

(Continued)

OTHER PUBLICATIONS

Machine translation for DE 102016117284, IDS (Year: 2018).*

(Continued)

*Primary Examiner* — Qian Yang
(74) *Attorney, Agent, or Firm* — Buchanan Ingersoll & Rooney PC

(57) ABSTRACT

The present disclosure relates to a method for determining the yaw angle of a trailer with respect to the longitudinal axis of a towing vehicle based on a feature included in multiple captured images by establishing a perpendicular bisector.

16 Claims, 3 Drawing Sheets

(56) References Cited

U.S. PATENT DOCUMENTS

| | | | |
|---|---|---|---|
| 2014/0200759 | A1 | 7/2014 | Lu et al. |
| 2014/0303847 | A1 | 10/2014 | Lavoie |
| 2015/0203128 | A1 | 7/2015 | Strano |
| 2015/0217693 | A1 | 8/2015 | Pliefke et al. |
| 2015/0286878 | A1 | 10/2015 | Molin |
| 2015/0302587 | A1 | 10/2015 | Hirano et al. |
| 2016/0023525 | A1 | 1/2016 | Lavoie |
| 2016/0048966 | A1 | 2/2016 | Kuehnle |
| 2016/0049020 | A1 | 2/2016 | Kuehnle et al. |
| 2016/0229451 | A1 | 8/2016 | Raad |
| 2016/0264046 | A1 | 9/2016 | Bochenek |
| 2016/0280258 | A1 | 9/2016 | Lavoie |
| 2016/0362135 | A1 | 12/2016 | Xu |
| 2017/0174023 | A1 | 6/2017 | Hu |
| 2017/0341583 | A1 | 11/2017 | Zhang |
| 2018/0001928 | A1 | 1/2018 | Lavoie |
| 2018/0181142 | A1 | 6/2018 | Baran |
| 2018/0202804 | A1* | 7/2018 | Dumble ................. G01B 21/16 |
| 2018/0251154 | A1 | 9/2018 | Lu et al. |
| 2018/0253608 | A1 | 9/2018 | Diessner et al. |
| 2018/0253609 | A1 | 9/2018 | Potter |
| 2018/0276839 | A1 | 9/2018 | Diessner et al. |
| 2018/0299885 | A1 | 10/2018 | Herzog et al. |
| 2018/0365509 | A1 | 12/2018 | Naserian et al. |
| 2019/0009815 | A1 | 1/2019 | Lavoie et al. |
| 2019/0082173 | A1 | 3/2019 | Schilling |
| 2019/0118594 | A1 | 4/2019 | Loeben |
| 2019/0335100 | A1 | 10/2019 | Chen |
| 2019/0339704 | A1 | 11/2019 | Yu et al. |
| 2019/0347825 | A1 | 11/2019 | Gupta et al. |
| 2019/0375399 | A1 | 12/2019 | Kasaiezadeh Mahabadi et al. |
| 2019/0375454 | A1 | 12/2019 | Kasaiezadeh Mahabadi et al. |
| 2020/0055356 | A1 | 2/2020 | Niewiadomski et al. |
| 2020/0215992 | A1 | 7/2020 | Plowman |
| 2020/0369320 | A1 | 11/2020 | Niewiadomski et al. |
| 2021/0019904 | A1 | 1/2021 | Seleusky et al. |
| 2021/0042961 | A1 | 2/2021 | Greenwood |
| 2021/0064046 | A1 | 3/2021 | Singh |
| 2021/0070362 | A1 | 3/2021 | Xu |
| 2021/0129752 | A1 | 5/2021 | Raeis Hosseiny |
| 2021/0370912 | A1 | 12/2021 | Yamamoto |
| 2022/0222850 | A1 | 7/2022 | Turner |
| 2023/0134205 | A1 | 5/2023 | Plowman et al. |
| 2023/0134206 | A1 | 5/2023 | Plowman et al. |
| 2023/0215035 | A1 | 7/2023 | Plowman et al. |
| 2023/0322032 | A1 | 10/2023 | Plowman |

FOREIGN PATENT DOCUMENTS

| | | | |
|---|---|---|---|
| CN | 106796729 | A | 5/2017 |
| CN | 106796730 | A | 5/2017 |
| CN | 107433905 | A | 12/2017 |
| CN | 109094669 | A | 12/2018 |
| CN | 208282792 | | 12/2018 |
| CN | 110576862 | A | 12/2019 |
| DE | 102011113197 | A1 | 3/2013 |
| DE | 102016117284 | A1 | 3/2018 |
| DE | 10 2018 123 250 | A1 | 3/2020 |
| EP | 1852821 | B1 | 4/2013 |
| EP | 2903256 | A1 | 8/2015 |
| EP | 3537382 | A1 | 9/2019 |
| EP | 3552926 | A1 | 10/2019 |
| JP | 2002120775 | A | 4/2002 |
| JP | 2006242943 | A | 9/2006 |
| JP | 2006246951 | A | 9/2006 |
| JP | 2012098984 | A | 5/2012 |
| WO | 2014050210 | A1 | 4/2014 |
| WO | 2019166065 | A1 | 9/2019 |
| WO | 2019170469 | A1 | 9/2019 |
| WO | 2019202317 | A1 | 10/2019 |

OTHER PUBLICATIONS

Notice of Reasons for Refusal drafted Sep. 28, 2023 for the counterpart Japanese Patent Application No. 2022-549860 and Global Dossier translation of same.

Christopher Charles De Saxe, "Vision-based trailer pose estimation for articulated vehicles", Sep. 2017.

European Patent Office Search Report dated Aug. 7, 2020 for the counterpart European Patent Application No. 20167188.0.

The International Search Report and the Written Opinion of the International Searching Authority mailed on Dec. 23, 2020 for the counterpart PCT Application No. PCT/EP2020/084109.

European Examination Report dated Mar. 7, 2024 for the counterpart European Patent Application No. 20 167 188.0.

File History for U.S. Appl. No. 17/995,120, including Non-Final office action dated Jun. 12, 2024.

Notice of Reasons for Refusal drafted Jan. 31, 2024 for counterpart Japanese Patent Application No. 2022-549860 and translation of same.

Dahal et al., "DeepTrailerAssist: Deep Learning Based Trailer Detection, Tracking and Articulation Angle Estimation on Automotive Rear-View Camera", 2019 IEEE/CVF International Conference on Computer Vision Workshop Seoul, Korea (South), (Month unknown 2019), pp. 2339-2346.

Fuchs et al., "Advanced 3-D Trailer Pose Estimation for Articulated Vehicles", 2015 IEEE Intelligent Vehicles Symposium (IV), COEX, Seoul Korea, (Jun. 28-Jul. 1, 2015), pp. 211-216.

Extended European Search Report issued Aug. 19, 2020, by the European Patent Office in European Patent Application No. 20167186.4-1210. (5 pages).

Notice of Allowance (Decision to Grant a Patent) issued Apr. 24, 2024, by the Japan Patent Office in Japanese Patent Application No. 2022-552585 and an English translation of the Notice of Allowance. (5 pages).

Notice of Allowance issued by the U.S. Patent and Trademark Office in the U.S. Appl. No. 17/995,120, mailed Oct. 9, 2024, U.S. Patent and Trademark Office, Alexandria, VA. (14 pages).

Notification of Transmittal of the International Search Report (Forms PCT/ISA/220 and PCT/ISA/210) and the Written Opinion of the International Searching Authority (Form PCT/ISA/237) issued Dec. 23, 2020, by the European Patent Office in corresponding International Application No. PCT/EP2020/084108. (11 pages).

Office Action (Notice of Reasons for Refusal) issued Aug. 30, 2023, by the Japan Patent Office in Japanese Patent Application No. 2022-549861 and an English translation of the Office Action. (7 pages).

Office Action (Notice of Reasons for Refusal) issued Aug. 30, 2023, by the Japan Patent Office in Japanese Patent Application No. 2022-552585 and an English translation of the Office Action. (9 pages).

Office Action (Notice of Reasons for Refusal) issued Jan. 17, 2024, by the Japan Patent Office in Japanese Patent Application No. 2022-552585 and an English translation of the Office Action. (11 pages).

Office Action issued by the U.S. Patent and Trademark Office in the U.S. Appl. No. 17/907,691, mailed Jan. 21, 2025, U.S. Patent and Trademark Office, Alexandria, VA. (27 pages).

Office Action (The First Office Action) issued Jun. 24, 2025, by the State Intellectual Property Office of People's Republic of China in Chinese Patent Application No. 202080098805.8 and an English translation of the Office Action. (14 pages).

Office Action (The First Office Action) issued Jun. 26, 2025, by the State Intellectual Property Office of People's Republic of China in corresponding Chinese Patent Application No. 202080098804.3 and an English translation of the Office Action. (15 pages).

Office Action (The First Office Action) issued Jul. 12, 2025, by the State Intellectual Property Office of People's Republic of China in Chinese Patent Application No. 202080098800.5 and an English translation of the Office Action. (11 pages).

Office Action (The First Office Action) issued Jul. 24, 2025, by the State Intellectual Property Office of People's Republic of China in Chinese Patent Application No. 202080098812.8 and an English translation of the Office Action. (18 pages).

(56) References Cited

OTHER PUBLICATIONS

Office Action issued by the U.S. Patent and Trademark Office in the U.S. Appl. No. 17/995,117, mailed Oct. 7, 2025, U.S. Patent and Trademark Office, Alexandria, VA. (31 pages).
Office Action issued by the U.S. Patent and Trademark Office in the U.S. Appl. No. 17/907,691, mailed Jul. 30, 2025, U.S. Patent and Trademark Office, Alexandria, VA. (11 pages).
Office Action issued by the U.S. Patent and Trademark Office in the U.S. Appl. No. 17/995,117, mailed Jan. 14, 2026, U.S. Patent and Trademark Office, Alexandria, VA. (25 pages).
Office Action (Notice of Reasons for Refusal) issued Mar. 11, 2026, by the Japan Patent Office in corresponding Japanese Patent Application No. 2022-549860 and an English translation of the Office Action. (5 pages).
Office Action (Second Examination Opinion Notice) issued Jan. 27, 2026, by the State Intellectual Property Office of People's Republic of China in Chinese Patent Application No. 202080098800.5 and an English machine translation of the Office Action. (9 pages).
Office Action (Second Examination Opinion Notice) issued Dec. 31, 2025, by the State Intellectual Property Office of People's Republic of China in Chinese Patent Application No. 202080098804.3 and an English machine translation of the Office Action. (6 pages).

* cited by examiner

METHOD AND SYSTEM FOR CALCULATING VEHICLE TRAILER ANGLE

CROSS-REFERENCE TO RELATED APPLICATIONS

The present application is a National Stage Application under 35 U.S.C. § 371 of International Patent Application No. PCT/EP2020/084109 filed on Dec. 1, 2020, and claims priority from European Patent Application No. 20167188.0 filed on Mar. 31, 2020, in the European Patent Office, the disclosures of which are herein incorporated by reference in their entireties

TECHNICAL FIELD

The present invention relates generally to the field of vehicle assistance systems. More specifically, the present invention relates to a method and a system for calculating yaw angle of a trailer coupled with a towing vehicle based on image information provided by a camera of the vehicle.

BACKGROUND

Methods for calculating the angle of a trailer with respect to the towing vehicle based on image information provided by a camera of the vehicle are already known.

Specifically, methods are known which have low computational complexity but do not provide robust angle information in case of poor-quality images.

In addition, in known methods the exact position of the towball has to be known in order to determine yaw angle.

SUMMARY

It is an objective of the embodiments of the present disclosure to provide a method for calculating yaw angle of a trailer with high robustness and high reliability without having knowledge of the position of the towball. The objective is addressed by the features of the independent claims. Example embodiments are given in the dependent claims. If not explicitly indicated otherwise, embodiments of the present disclosure may be freely combined with each other.

According to an aspect, the present disclosure refers to a method for determining the yaw angle of a trailer with respect to the longitudinal axis of a towing vehicle. The method includes the following steps:

First, at least a first and a second image of the trailer is captured using a camera. The first and second images are captured such that the orientation of the trailer with respect to the vehicle is different on the at least two images.

After capturing the images, at least a first feature of the trailer is determined. The first feature has to be visible on first and second image. For example, the first feature may be a conspicuous first characteristic at a first location of the trailer.

After feature determination, a ray between the camera and determined first feature on the first image is established and the ray is projected onto a horizontal plane thereby obtaining a first projected feature position. Similarly, a ray between the camera and determined first feature on the second image is established and the ray is projected onto the horizontal plane thereby obtaining a second projected feature position. The projection of features, respectively, rays may be performed in a vertical direction, i.e. a slanted ray may be transferred in a horizontal ray without changing the azimuth.

Based on the projections of first feature, a first perpendicular bisector is established between the location of the first projected feature position and the location of the second projected feature position. More in detail, the first perpendicular bisector may be a perpendicular straight line running through the center of the line connecting an intersection of a first ray with a horizontal plane (e.g. at z=1) and the location of an intersection of a second ray with the horizontal plane. The first ray is determined by converting the image coordinates of the first feature in the first image into an optical ray using the cameras calibration information. The second ray is determined by converting the image coordinates of the first feature in the second image into an optical ray using the cameras calibration information. The first perpendicular bisector may be established in a horizontal plane.

After establishing the first perpendicular bisector, a first intersection point of first perpendicular bisector with a reference axis is determined. The reference axis may be the central longitudinal axis of the car, on which the camera and towball both lie. Thus, this intersection point represents the center of rotation of the first feature.

Finally, the yaw angle of the trailer is calculated based on a first angle estimation, the first angle estimation referring to the angle between a first line running from first projected feature position to the first intersection point and a second line running from second projected feature position to the first intersection point in the horizontal plane.

The method is advantageous because due to using two or more images and using one or more trailer features for establishing one or more perpendicular bisectors and calculating the yaw angle based on the one or more perpendicular bisectors, the results of yaw angle determination are very accurate and robust even when the detection of trailer features suffers from high noise or the quality of the images is poor. In addition, due to using a perpendicular bisector, for determining the yaw angle, the exact position of the towball can be unknown.

According to an embodiment, on first or second image, the yaw angle of the trailer with respect to the vehicle is zero. Thereby, the image can be used as "zero-pose image", i.e. as a reference of an exact alignment of the longitudinal axis of the vehicle with the longitudinal axis of the trailer. However, also another yaw angle value can be used as reference value. If the other yaw angle is not known, the system can calculate the change in trailer angle, rather than an absolute trailer angle.

According to an embodiment, the method further includes the following steps:

- In addition to the first feature, a second feature of the trailer is determined which is visible on first and second image. The second feature is arranged at a different position of the trailer than the first feature. The second feature may be a conspicuous second characteristic at a second location of the trailer.
- In addition, a ray between the camera and determined second feature on the first image is projected onto the horizontal plane thereby obtaining a third projected feature position. Similarly, a ray between the camera and determined second feature on the second image is projected onto the horizontal plane thereby obtaining a fourth projected feature position.
- Furthermore, a second perpendicular bisector is established between the location of the third projected feature position and the location of the fourth projected feature position.

Based on the second perpendicular bisector, a second intersection point of second perpendicular bisector with the reference axis is determined.

Based on second perpendicular bisector, a second angle estimation is established, the second angle estimation referring to the angle between a first line running from third projected feature position to the second intersection point and a second line running from fourth projected feature position to the second intersection point in the horizontal plane.

Finally, the yaw angle is calculated based on the first and second angle estimations.

By using two or more trailer features and multiple perpendicular bisectors, the noise and mismatches in determining the pivot angle between perpendicular bisector and reference axis can be mitigated.

According to an embodiment, in addition to the first and second feature, at least one further feature of the trailer is used for calculating the yaw angle. Using three or more features further increases the robustness and reliability of yaw angle determination.

According to an embodiment, the yaw angle is calculated by establishing the median value based on the at least two angle estimations. Thereby, a very stable yaw angle determination can be obtained.

According to other embodiments, the yaw angle is calculated by establishing an average value of the at least two angle estimations or by using a statistical approach applied to the angle estimations.

According to an embodiment, the method further includes the step of determining an angle window. The angle window may include an upper and a lower bound around the yaw angle. In addition, a set of features is determined, the features within the set of features leading to angle estimations which are located within the angle window. The determined set of features, preferably, only features included in the set of features are used for future yaw angle calculations. So, in other words, information of previous yaw angle determinations is used to determine two or more features of the trailer which lead to angle estimations quite close to determined yaw angle (i.e. within the angle window) and to not track those features which lead to angle estimations significantly deviating from determined yaw angle (i.e. out of the angle window). Thereby, the computational complexity and accuracy of angle estimation can be significantly reduced.

According to an embodiment, camera calibration information is used for converting the position of the first and/or second feature from local domain of the image into local domain of the vehicle. For example, having knowledge of camera position using camera calibration information, the position of a certain feature on the image can be transferred in location information depending on or being correlated with the position of the camera included or attached to the vehicle.

According to an embodiment, the reference axis is the longitudinal axis of the towing vehicle if the camera and the towball of the vehicle are arranged in a vertically oriented plane which includes the longitudinal axis of the towing vehicle. So, in other words, the yaw angle is determined based on angle estimations, the angle estimations referring to angles between the longitudinal axis of the towing vehicle and the established perpendicular bisectors.

According to another embodiment, the reference axis is a straight line running between the camera and the towball if the camera and/or the towball have a lateral offset with respect to the longitudinal axis of the towing vehicle. Thereby, a lateral offset between the camera and the towball can be compensated.

According to an embodiment, the camera is the rear view camera of the vehicle. Based on the rear view camera, images of the trailer can be captured with reduced technical effort.

According to an embodiment, the location of the first feature is not only determined in a first and second image but also in at least a third image. The location of the first feature in the third image is different to the location of the first feature in the first image and second image. A first perpendicular bisector can be determined between the first feature in the first image and the second image. A further perpendicular bisector can be determined between the first feature in the first image and the third image. A further intersection point can then be determined on the basis of the intersection of the first perpendicular bisector and the further perpendicular bisector.

Based on the first perpendicular bisector, a first angle estimation is calculated. The first angle estimation is the angle of rotation around the further intersection point, of the intersection of the first ray with the horizontal plane to the intersection of the second ray with the horizontal plane. The first angle estimation corresponds to the change in yaw angle of the trailer between the first image and the second image. So in other words, the point of rotation of the trailer is not determined by an intersection of first perpendicular bisector with reference axis but by intersecting at least two perpendicular bisectors obtained by tracking a feature over tree or more images.

According to a further aspect, a system for determining the yaw angle of a trailer with respect to the longitudinal axis of a towing vehicle is disclosed. The system includes a camera for capturing images of the trailer and a processing entity for processing the captured images. The system is further configured to execute the steps of:

capturing at least a first and a second image of the trailer using a camera, the orientation of the trailer with respect to the vehicle being different on the at least two images;

determining at least a first feature of the trailer which is visible on first and second image;

projecting the ray between the camera and determined first feature on the first image onto a horizontal plane thereby obtaining a first projected feature position and projecting the ray between the camera and determined first feature on the second image onto the horizontal plane thereby obtaining a second projected feature position;

establishing a first perpendicular bisector between the location of the first projected feature position and the location of the second projected feature position;

determining a first intersection point of first perpendicular bisector with a reference axis; and calculating the yaw angle based on a first angle estimation, the first angle estimation referring to the angle between a first line running from first projected feature position to the first intersection point and a second line running from second projected feature position to the first intersection point in the horizontal plane.

Any upper-mentioned feature described as an embodiment of the method is also applicable as a system feature in a system according to the present disclosure.

According to yet another embodiment, a vehicle including a system according to anyone of upper-mentioned embodiments is disclosed.

The term "vehicle" as used in the present disclosure may refer to a car, truck, bus, train or any other crafts.

The term "yaw angle" as used in the present disclosure may refer to a pivot angle between the longitudinal axis of the vehicle and the longitudinal axis of the trailer.

The term "median" as used in the present disclosure may refer to a value separating a higher half from a lower half of a data sample or a probability distribution.

The term "essentially" or "approximately" as used in the present disclosure means deviations from the exact value by +/−10%, preferably by +/−5% and/or deviations in the form of changes that are insignificant for the function and/or for the traffic laws.

BRIEF DESCRIPTION OF THE DRAWINGS

Various aspects of the invention, including its particular features and advantages, will be readily understood from the following detailed description and the accompanying drawings, in which.

DETAILED DESCRIPTION

Figure 1:
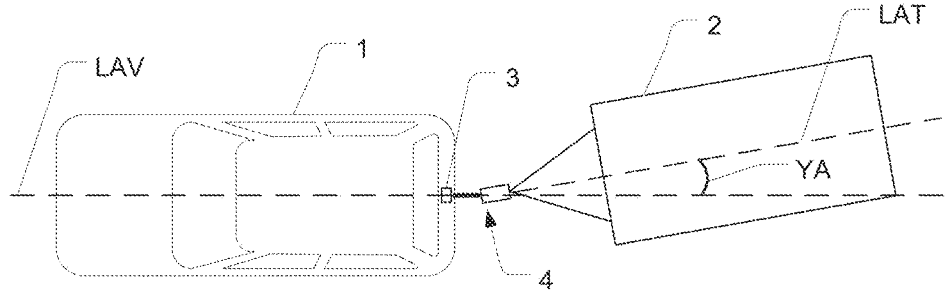
FIG. 1 shows an exemplary top view on a vehicle towing a trailer.

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present invention disclosed in the specification, the claims, examples and/or the figures may both separately and in any combination thereof be material for realizing the invention in various forms thereof.

FIG. 1 shows a top view illustration of a vehicle 1 towing a trailer 2. The vehicle 1 includes a longitudinal axis LAV which runs through the center of the vehicle 1. Similarly, the trailer 2 includes a longitudinal axis LAT which runs through the center of the trailer 2. The trailer 2 is coupled with the vehicle 1 by means of a trailer hitch including a towball 4.

In certain driving situations, the longitudinal axis LAV of the vehicle 1 and the longitudinal axis LAT of the trailer 2 may not be aligned in parallel or may not fall into one another but the axes may confine a yaw angle YA. In other words, the yaw angle YA defines the angular deviation of the longitudinal axis LAT of the trailer 2 with respect to the longitudinal axis LAV of the vehicle 1. The yaw angle YA may be measured in a horizontal plane which includes the longitudinal axis LAT of the trailer 2 as well as the longitudinal axis LAV of the vehicle 1.

The knowledge of yaw angle YA is—inter alia—advantageous in trailer assistance systems, for example.

For determining the yaw angle YA, multiple images of at least a portion of the trailer 2 are captured by means of a camera 3. The camera 3 may be, for example, a rear view camera of the vehicle, which may also be used for capturing images of the surroundings of the car when driving backwards. One of the captured images may refer to a known angular arrangement of the trailer 2 with respect to the towing vehicle 1. The image may be used as a reference for calculating the yaw angle YA. In the known angular arrangement of the trailer 2 with respect to the towing vehicle 1, the yaw angle YA may be 0° or any other angle value.

Figure 2:
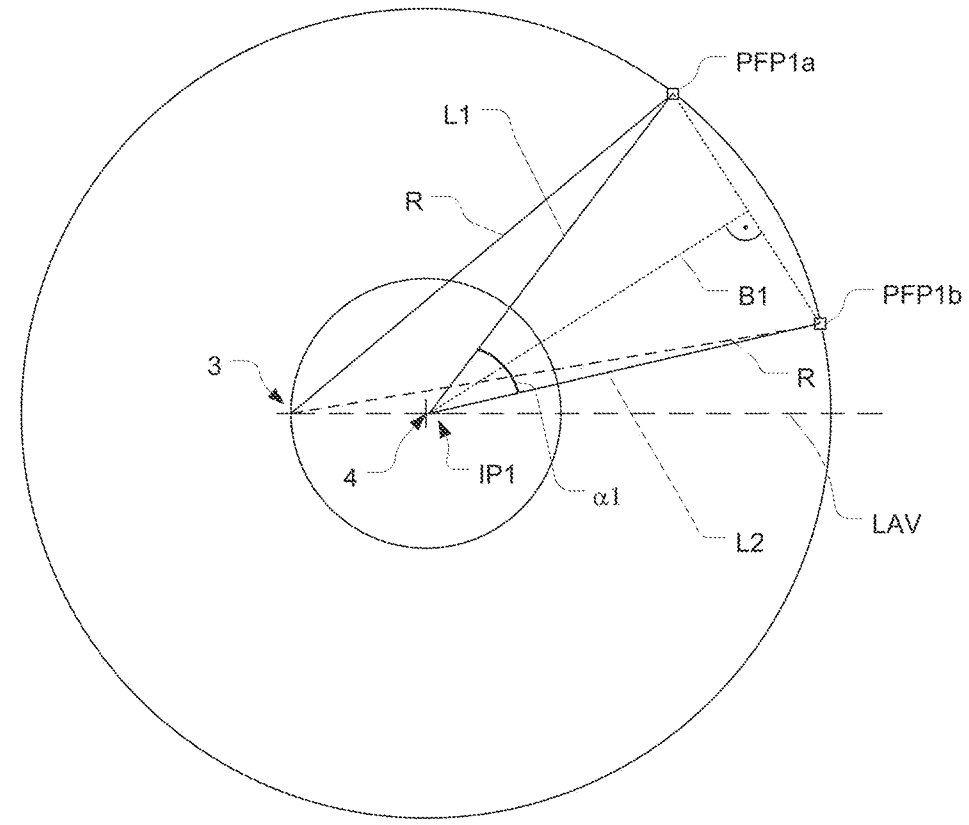
FIG. 2 schematically illustrates angle estimation based on a single feature captured by camera images in different pivot angles between the trailer and the towing vehicle.

FIG. 2 shows a schematic diagram showing the angular relationship of a first feature F1 of the trailer 2 at different points of time at which the trailer 2 has a different yaw angle YA with respect to the towing vehicle 1.

The camera 3 may capture two or more images at different points of time at which the angular position of the trailer 2 with respect to the vehicle 1 is different. For example, an image series may be captured.

In the present example, the second image may show an orientation of the trailer with respect to the vehicle at a yaw angle YA=0°.

Because of the angular movement of trailer 2 over time, a certain feature detected at the trailer may appear at different positions in the first and second image. In FIG. 2, the first feature is represented by a square.

The upper representation of first feature (associated with the solid optical ray R connecting the feature with the camera 3) is identified in a first image, the lower representation of first feature (associated with dashed optical ray R connecting the feature with the camera 3) is identified in a second image at a different point of time. For correlating the location of first feature in the respective image with the location of the vehicle 1, specifically a certain fix point of the vehicle 1, calibration information of the camera 3 may be used. Specifically, for determining the optical rays R connecting the first feature with the camera 3, calibration information of the camera 3 may be used to transform the location of the first feature in image coordinates into optical rays. In other words, for associating camera position and feature position, the location of feature on the image is correlated with a position of a fix point of the vehicle based on calibration information of the camera 3.

Features on the trailer are located and matched using feature detection and matching algorithm. For example, the Harris Corner Detector, Scale-Invariant Feature Transform (SIFT) algorithm, Speeded Up Robust Features (SURF) algorithm, Binary Robust Invariant Scalable Keypoints (BRISK) algorithm, Binary Robust Independent Elementary Features (BRIEF), Oriented FAST and rotated BRIEF (ORB) algorithm or another suitable feature detection and matching algorithm could be used.

The feature detection and matching algorithm may detect image features that are on the trailer or not on the trailer. To segment the trailer features from the non-trailer features a number of different methods could be used. For instance, when driving forwards in a straight line, trailer features may be segmented from non-trailer features by looking for features that remain in the same position over time. Alternatively, the motion of background features can be modelled over time using the vehicle's known motion. This could be extracted from CAN data regarding speed and steering. Features which do not fit the Epipolar constraint of the Essential Matrix could then be considered as trailer features.

After feature identification in the respective images, the first feature of first and second images are projected in a common horizontal plane. More in detail, the ray between the camera 3 and determined first feature on the first image is projected onto a horizontal plane thereby obtaining a first projected feature position PFP1*a*. In addition, the ray between the camera 3 and determined first feature on the second image is projected onto the same horizontal plane thereby obtaining a second projected feature position PFP1*b*. It is worth mentioning that the projection is made in the vertical direction thereby only changing the elevation angle of optical rays but not the azimuth angle.

After determining first and second projected feature positions PFP1*a*, PFP1*b*, a first perpendicular bisector B1 is established based on the first and second projected feature positions PFP1*a*, PFP1*b*. As shown in FIG. 2, the first perpendicular bisector B1 is a line being perpendicular to the line linking first and second projected feature positions PFP1*a*, PFP1*b*. In addition, the first perpendicular bisector B1 runs through the center of the linking line. The first perpendicular bisector B1 crosses a reference axis, which is in the present embodiment the longitudinal axis of the vehicle LAV. The intersection of first perpendicular bisector B1 and reference axis provides the point of rotation, around which the trailer is rotated. More in detail, the intersection provides the position of the towball 4.

Based on the first perpendicular bisector B1, a first angle estimation α1 is calculated. The first angle estimation α1 refers to an angle provided between a first line L1 linking first projected feature position PFP1*a* and the intersection of first perpendicular bisector B1 and the reference axis and a second line L2 linking second projected feature position PFP1*b* and the intersection of first perpendicular bisector B1 and the reference axis. The intersection may be indicative for the position of towball 4. More in detail, the first angle estimation α1 characterizes the pivot angle of the trailer 2 in a horizontal plane between the location of the first feature in the first image projected on the horizontal plane and the location of the first feature in the second image projected on the horizontal plane around the first intersection point IP1 (which is the position of towball 4).

The first angle estimation α1 represents the yaw angle YA of the trailer 2 around its actual point of rotation.

Figure 3:
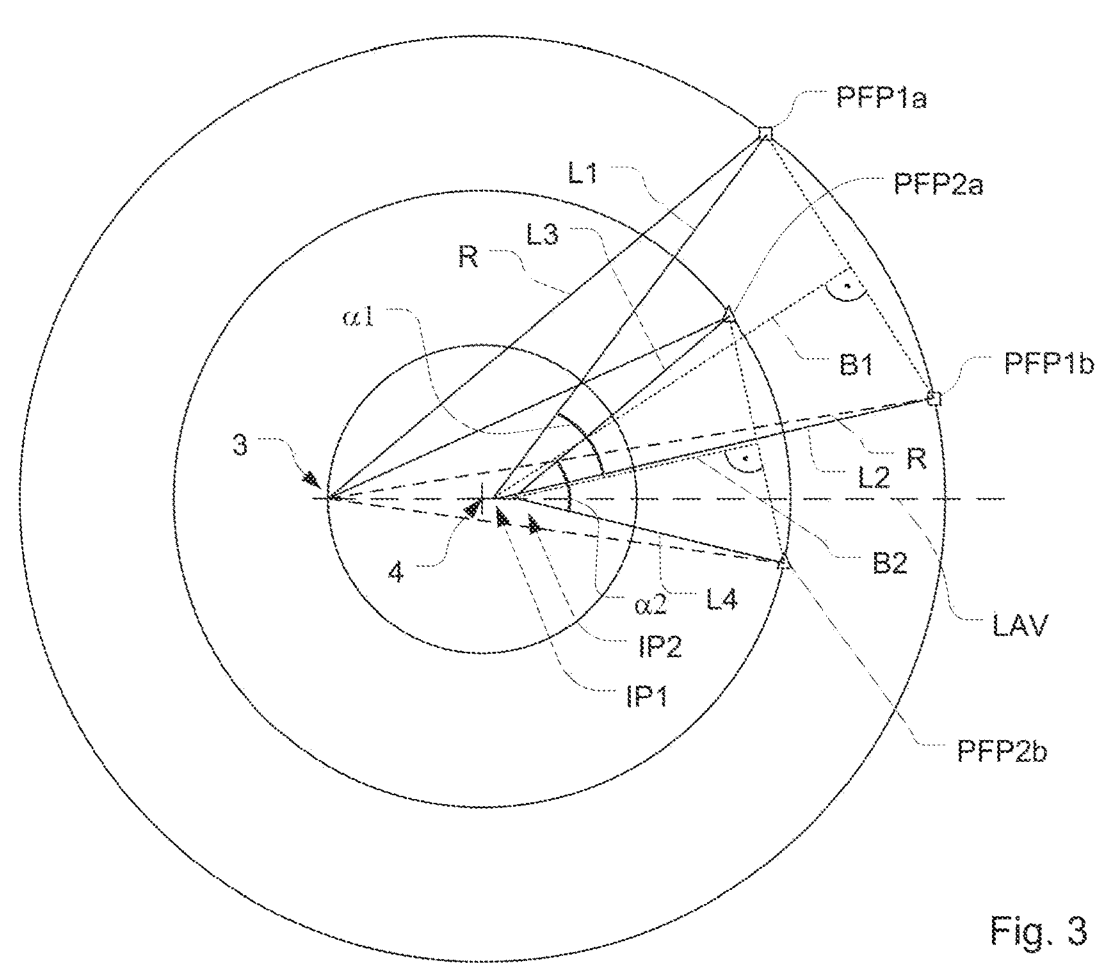
FIG. 3 schematically illustrates angle estimations based on a first and a second feature captured by camera images in different pivot angles between the trailer and the towing vehicle.

FIG. 3 illustrates an embodiment similar to FIG. 2 which uses a first and a second feature F1, F2 of the trailer 2 captured at different points of time (at which the trailer 2 has a different yaw angle YA with respect to the towing vehicle 1) for establishing yaw angle YA.

On the images captured by the camera 3, multiple different features may be identifiable. As shown in FIG. 3, the features are identified at different angular positions with respect to a fix point of the vehicle 1. The first feature is illustrated by a square, the second feature is illustrated by a triangle. The fix point may be the location of the camera 3 or may be the location of the towball 4.

In FIG. 3, the upper pair of first and second feature (indicated by PFP1*a*, PFP2*a* and associated with the solid optical rays connecting the features with the camera 3) are identified in a first image, the lower pair of first and second feature F1, F2 (indicated by PFP1*b*, PFP2*b* and associated with dashed optical rays connecting the features with the camera 3) are identified in a second image at a different point of time.

The determination of yaw angle YA is performed analogously to the embodiment of FIG. 2. The main difference is that two angle estimations α1, α2 are established and the yaw angle of the trailer is developed based on the two angle estimations α1, α2. More in detail, establishing first perpendicular bisector B1 and obtaining first angle estimation α1 is performed like described above.

In addition, second angle estimation α2 is obtained by establishing third projected feature position PFP2*a* and fourth projected feature position PFP2*b*, establishing a second perpendicular bisector B2 in order to obtain a second intersection point IP2 and connecting the third projected feature position PFP2*a* and the fourth projected feature position PFP2*b* with the second intersection point IP2. The third projected feature position PFP2*a* is obtained by projecting second feature in the first image onto the horizontal plane and fourth projected feature position PFP2*b* is obtained by projecting second feature in the second image onto the horizontal plane. The second intersection point IP2 may be the point in which the second perpendicular bisector B2 crosses the reference axis, in the present embodiment the longitudinal axis of the vehicle LAV. The second angle estimation α2 is the angle between a first line linking third projected feature position PFP2*a* and intersection point IP2 and a second line linking fourth projected feature position PFP2*b* and intersection point IP2.

In the present embodiment, the reference axis is the longitudinal axis LAV of the towing vehicle 1, because the camera 3 as well as the towball 4 is located on the longitudinal axis LAV of the vehicle 1. In other embodiments, if the camera 3 or the towball 4 has a lateral offset to the longitudinal axis LAV of the vehicle 1 or the lateral offset of the camera 3 and the towball 4 with respect to the longitudinal axis LAV of the vehicle 1 is different, the reference axis may be formed by a straight line linking the camera 3 and the towball 4.

Under ideal conditions, the first angle estimation α1 and the second angle estimation α2 should be equal (α1=α2) and should represent the yaw angle YA. However, due to noise and mismatches, the values of first and second angle estimation α1, α2 can be different.

It is worth mentioning that more than two features of the trailer 2 could be determined and tracked over multiple images. In addition, preferably, more than two images are captured at different points of time in order to enhance the result of yaw angle estimation. Thereby, more than two angle estimations α1, α2 can be established for increasing the quality of yaw angle determination.

For determining the yaw angle YA based on first and second angle estimations α1, α2 having different values, a statistical measure may be used. According to a first embodiment, the median of two or more angle estimations α1, α2 may be used to determine the yaw angle YA. According to other embodiments, a statistical method may be used to determine the yaw angle YA based on of two or more angle estimations α1, α2. The statistical method may be, for example, RANSAC-algorithm (RANSAC: random sample consensus) or least squares algorithm.

It appeared that not all features visible on the captured images are equally suitable for calculating yaw angle YA. In order to reduce computational complexity and robustness, those features are selected and further used for determining yaw angle YA, which provide pivot angles quite close to actual yaw angle. For feature selection, only those features may be tracked in future images which provided pivot angles α1, α2 in a certain window around the actual yaw angle. For example, the window may be defined by an upper and a lower boundary, the upper and lower boundary defining an angular window around the actual yaw angle. For example, the window may span over a distance of 2° to 10°, more particular between 3° and 5°. All features which led to pivot angles within the window in the last two or more yaw angle determination steps are further tracked in the next captured images.

In case of tracking a particular trailer feature for multiple images, due to the movement of the trailer 2, the samples of the feature may be arranged on a circle segment. The center of the circle segment represents the location of towball 4. Therefore, by tracking a particular trailer feature over multiple images, the location of towball 4 may be derived.

In order to mitigate noise, the determination of the location of towball 4 may consider multiple trailer features tracked for a period of time over multiple images. Each trailer feature may correspond to a circle segment with certain center estimation. By applying a statistical method on the multiple center estimations, the actual location of towball 4 may be developed. The statistical method may be, for example, RANSAC-algorithm or least squares algorithm.

Figure 4:
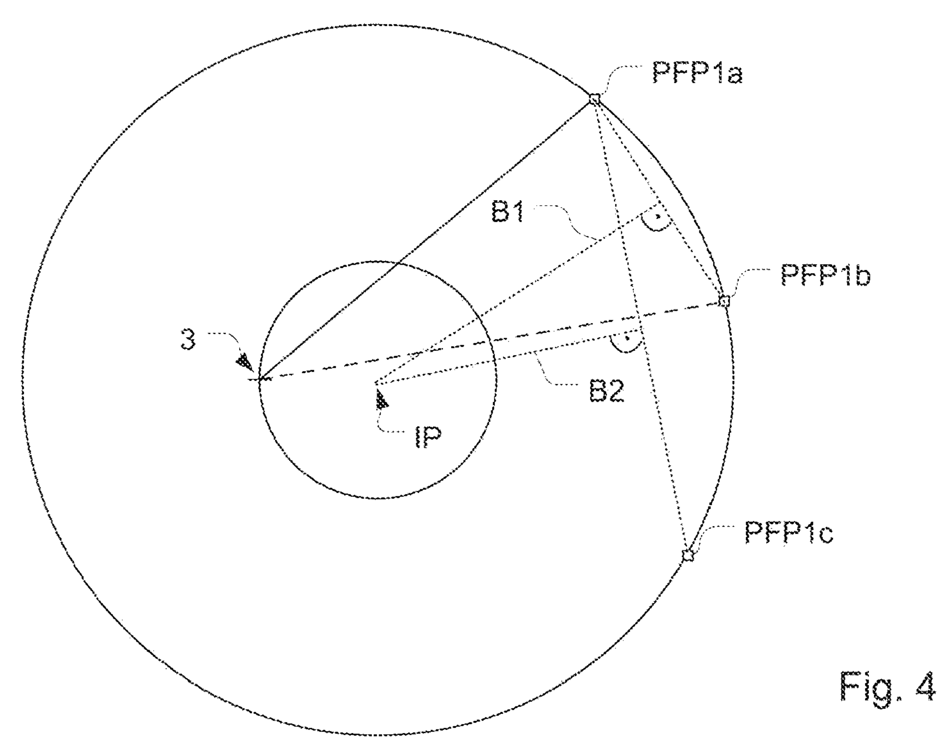
FIG. 4 schematically illustrates the geometrical determination of point of rotation based on first and second perpendicular bisectors obtained from a single trailer feature included in three different images.

FIG. 4 shows a further embodiment of geometrically determining the point of rotation without using upper-mentioned reference axis.

The point of rotation is established by developing at least two perpendicular bisectors B1, B2 based on three images which show a certain feature in different angular positions with respect to the towing vehicle 1. In FIG. 4, first projected feature position PFP1*a* refers to a feature included in first image and projected in a common horizontal plane as mentioned before. Similarly, the second projected feature position PFP1*b* refers to a feature included in a second image and third projected feature position PFP1*c* refers to a feature included in a third image.

The first perpendicular bisector B1 refers to a line linking first and second projected feature positions PFP1*a*, PFP1*b*. The second perpendicular bisector B2 refer to a line linking first and third projected feature positions PFP1*a*, PFP1*c*. The intersection of first and second perpendicular bisectors B1, B2 defines an intersecting point IP which is indicative for the point of rotation of the trailer 2, i.e. indicative for the position of the towball 4.

The intersecting point IP may be used for determining the yaw angle YA of the trailer as shown in the embodiments of FIGS. 2 and 3.

Figure 5:
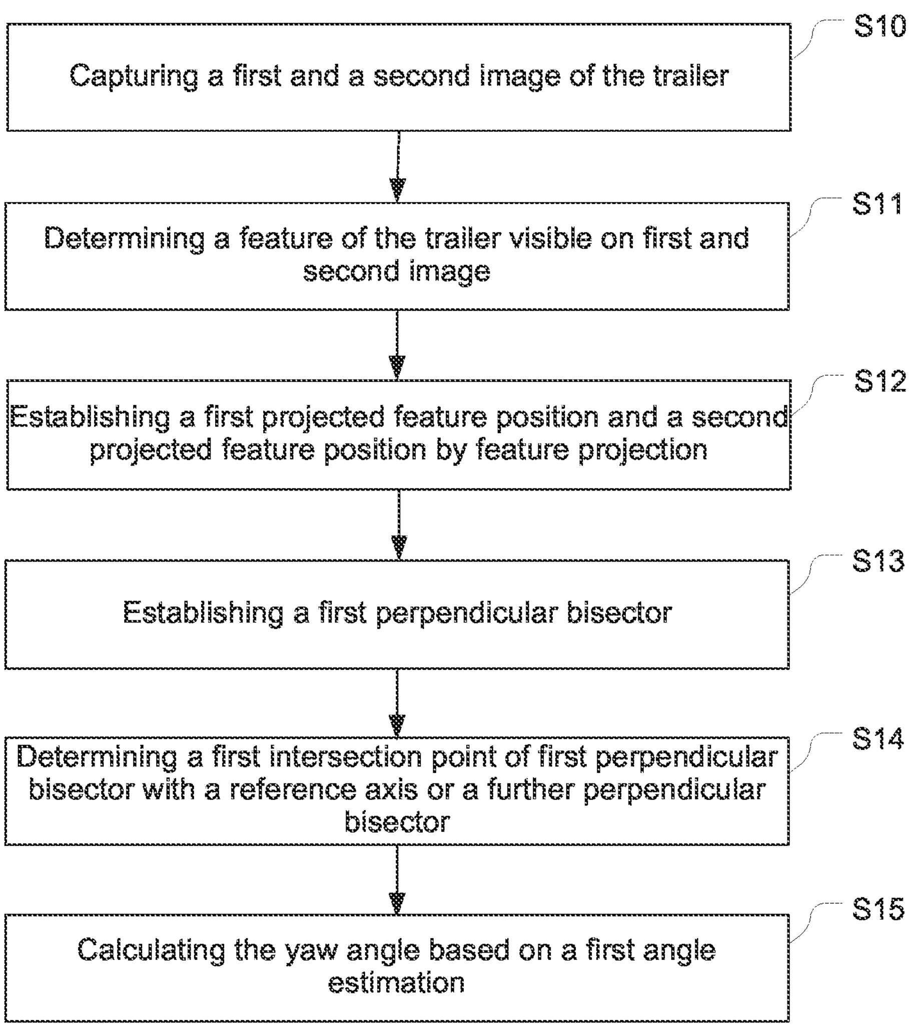
FIG. 5 shows a schematic block diagram illustrating the steps of a method for determining the yaw angle of a trailer with respect to the longitudinal axis of a towing vehicle.

FIG. 5 shows a block diagram illustrating the method steps of a method for determining the yaw angle YA of a trailer 2 with respect to the longitudinal axis LAV of a towing vehicle 1.

As a first step, a first and a second image of the trailer is captured (S10).

After image capturing, at least one feature of the trailer visible on the first and the second images is determined (S11).

After feature determination, a first projected feature position and a second projected feature position are established by feature projection (S12).

After feature projection, a first perpendicular bisector is established (S13).

After establishing first perpendicular bisector, a first intersection point of first perpendicular bisector with a reference axis or a further perpendicular bisector is developed (S14).

Finally, the yaw angle is calculated based on first angle estimation (S15).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 vehicle
2 trailer
3 camera
4 towball
α1 first angle estimation
α2 second angle estimation
B1 first perpendicular bisector
B2 second perpendicular bisector
PFP1*a* projected feature position of first feature in first image
PFP1*b* projected feature position of first feature in second image
PFP1*c* projected feature position of first feature in third image
PFP2*a* projected feature position of second feature in first image
PFP2*b* projected feature position of second feature in second image
IP intersecting point
IP1 first intersection point
IP2 second intersection point
LAT longitudinal axis of trailer
LAV longitudinal axis of vehicle
R optical ray
YA yaw angle

The invention claimed is:

1. A method for determining yaw angle of a trailer with respect to the longitudinal axis of a towing vehicle, the method comprising:

capturing at least a first and a second image of the trailer using a camera, the orientation of the trailer with respect to the vehicle being different on the at least two images;

determining a first feature of the trailer which is visible on the first and second images;

determining a second feature of the trailer which is visible on the first image and the second image, wherein the second feature is arranged at a different position of the trailer than the first feature;

projecting a ray between the camera and the determined first feature on the first image onto a horizontal plane thereby obtaining a first projected feature position and projecting the ray between the camera and the determined first feature on the second image onto the horizontal plane thereby obtaining a second projected feature position, wherein the projecting the ray between the camera and the determined first feature comprises using camera calibration information of the camera to transform a location of the determined first features into the ray;

projecting a ray between the camera and the determined second feature on the first image onto the horizontal plane thereby obtaining a third projected feature position and projecting the ray between the camera and the determined second feature on the second image onto the horizontal plane thereby obtaining a fourth projected feature position, wherein the projecting the ray between the camera and the determined second feature comprises using the camera calibration information of the camera to transform a location of the determined second features into the ray;

establishing a first perpendicular bisector between a location of the first projected feature position and a location of the second projected feature position;

establishing a second perpendicular bisector between a location of the third projected feature position and a location of the fourth projected feature position;

determining a first intersection point of the first perpendicular bisector with a reference axis or a further perpendicular bisector;

determining a second intersection point of the second perpendicular bisector with the reference axis;

calculating a first angle estimation, the first angle estimation referring to an angle between a first line running from the first projected feature position to the first intersection point and a second line running from the second projected feature position to the first intersection point in the horizontal plane;

calculating a second angle estimation, the second angle estimation referring to an angle between a first line running from the third projected feature position to the second intersection point and a second line running from the fourth projected feature position to the second intersection point in the horizontal plane; and calculating the yaw angle based on the first and second angle estimations, wherein the yaw angle is calculated without information regarding a position of a towball of the towing vehicle.

2. The method according to claim 1, wherein on the first or second image, the yaw angle of the trailer with respect to the vehicle is zero or any known yaw angle which can be used as a reference angle.

3. The method according to claim 1, wherein in addition to the first and second features, at least one further feature of the trailer is used for calculating the yaw angle.

4. The method according to claim 1, wherein the yaw angle is calculated by establishing a median value based on the at least two angle estimations.

5. The method according to claim 1, wherein the yaw angle is calculated by establishing an average value of the at least two angle estimations or by using a statistical approach applied to the angle estimations.

6. The method according to claim 1, further comprising determining an angle window, the angle window comprising an upper and a lower bound around the yaw angle, determining a set of features which lead to angle estimations within the angle window, and using the determined set of features for future yaw angle calculations.

7. The method according to claim 1, wherein camera calibration information is used for converting the position of the first and/or second feature from a local domain of the image into a local domain of the vehicle.

8. The method according to claim 1, wherein the camera is a rear view camera of the vehicle.

9. The method according to claim 1, wherein determining the first and second features visible in the first and second images comprises a feature matching process, the feature matching process comprising one or more algorithms selected from the group consisting of Harris Corner Detector algorithm, Scale-Invariant Feature Transform algorithm, Speeded Up Robust Features algorithm, Binary Robust Invariant Scalable Keypoints algorithm, Binary Robust Independent Elementary Features (BRIEF) algorithm, and Oriented Features from Accelerated Segment Test (FAST) and rotated BRIEF algorithm.

10. A system for determining the yaw angle of a trailer with respect to the longitudinal axis of a towing vehicle, the system comprising a camera for capturing images of the trailer and a processor for processing the captured images, the system further being configured to execute:

capturing at least a first and a second image of the trailer using a camera, an orientation of the trailer with respect to the vehicle being different on the at least two images;

determining at least a first feature of the trailer which is visible on the first and second images;

determining a second feature of the trailer which is visible on the first image and the second image, wherein the second feature is arranged at a different position of the trailer than the first feature;

projecting a ray between the camera and the determined first feature on the first image onto a horizontal plane thereby obtaining a first projected feature position and projecting a ray between the camera and determined first feature on the second image onto the horizontal plane thereby obtaining a second projected feature position, wherein the projecting the ray between the camera and the determined first feature comprises using camera calibration information of the camera to transform a location of the determined first features into the ray;

projecting a ray between the camera and the determined second feature on the first image onto the horizontal plane thereby obtaining a third projected feature position and projecting the ray between the camera and the determined second feature on the second image onto the horizontal plane thereby obtaining a fourth projected feature position, wherein the projecting the ray between the camera and the determined second feature comprises using the camera calibration information of the camera to transform a location of the determined second features into the ray;

establishing a first perpendicular bisector between a location of the first projected feature position and a location of the second projected feature position;

establishing a second perpendicular bisector between a location of the third projected feature position and a location of the fourth projected feature position;

determining a first intersection point of the first perpendicular bisector with a reference axis or a further perpendicular bisector;

determining a second intersection point of the second perpendicular bisector with the reference axis;

calculating a first angle estimation, the first angle estimation referring to an angle between a first line running from the first projected feature position to the first intersection point and a second line running from the second projected feature position to the first intersection point in the horizontal plane;

calculating a second angle estimation, the second angle estimation referring to an angle between a first line running from the third projected feature position to the second intersection point and a second line running from the fourth projected feature position to the second intersection point in the horizontal plane; and calculating the yaw angle based on the first and second angle estimations, wherein the yaw angle is calculated without information regarding a position of a towball of the towing vehicle.

11. A vehicle comprising a system according to claim 10.

12. The system according to claim 10, wherein in addition to the first and second features, at least one further feature of the trailer is used for calculating the yaw angle.

13. The system according to claim 10, wherein the yaw angle is calculated by establishing a median value based on the at least two angle estimations.

14. The system according to claim 10, wherein the yaw angle is calculated by establishing an average value of the at least two angle estimations or by using a statistical approach applied to the angle estimations.

15. A method for determining the yaw angle of a trailer with respect to the longitudinal axis of a towing vehicle, the method comprising:

receiving at least a first and a second image of the trailer using a camera, the orientation of the trailer with respect to the vehicle being different on the at least two images;

determining at least a first feature of the trailer which is visible on first and second image;

determining a second feature of the trailer which is visible on the first image and the second image, wherein the second feature is arranged at a different position of the trailer than the first feature;

projecting a ray between the camera and a determined first feature on the first image onto a horizontal plane thereby obtaining a first projected feature position and projecting the ray between the camera and the determined first feature on the second image onto the horizontal plane thereby obtaining a second projected feature position, wherein the projecting the ray between the camera and the determined first feature comprises using camera calibration information of the camera to transform a location of the determined first features into the ray;

projecting a ray between the camera and the determined second feature on the first image onto the horizontal plane thereby obtaining a third projected feature position and projecting the ray between the camera and the determined second feature on the second image onto the horizontal plane thereby obtaining a fourth projected feature position, wherein the projecting the ray between the camera and the determined second feature comprises using the camera calibration information of the camera to transform a location of the determined second features into the ray;

establishing a first perpendicular bisector between a location of the first projected feature position and a location of the second projected feature position;

establishing a second perpendicular bisector between a location of the third projected feature position and a location of the fourth projected feature position;

determining a first intersection point of the first perpendicular bisector with a reference axis or a further perpendicular bisector;

determining a second intersection point of the second perpendicular bisector with the reference axis;

calculating a first angle estimation, the first angle estimation referring to an angle between a first line running from the first projected feature position to the first intersection point and a second line running from the second projected feature position to the first intersection point in the horizontal plane; and calculating a second angle estimation, the second angle estimation referring to an angle between a first line running from the third projected feature position to the second intersection point and a second line running from the fourth projected feature position to the second intersection point in the horizontal plane; and calculating the yaw angle based on the first and second angle estimations, wherein the yaw angle is calculated without information regarding a position of a towball of the towing vehicle.

16. The method according to claim 15, wherein the yaw angle is calculated by one of establishing a median value based on the at least two angle estimations, or establishing an average value of the at least two angle estimations or by using a statistical approach applied to the angle estimations.

* * * * *